United States Patent [19]
de Passoz

[11] 4,358,845
[45] Nov. 9, 1982

[54] PROCESS FOR THE COMPRESSION OF SIGNALLING DATA OR THE LIKE TRANSMITTED IN A TRAIN OF MULTIPLEXED PCM INFORMATION

[75] Inventor: Guy A. M. de Passoz, Lesigny, France

[73] Assignee: Societe Anonyme de Telecommunications Company, Paris, France

[21] Appl. No.: 127,268

[22] Filed: Mar. 5, 1980

[51] Int. Cl.³ .............................................. H04J 3/12
[52] U.S. Cl. .................................... 370/44; 370/110; 370/118
[58] Field of Search .......................... 370/44, 110, 118; 375/25, 37; 179/15.55 R

[56] References Cited

U.S. PATENT DOCUMENTS

| | | | |
|---|---|---|---|
| 3,720,791 | 3/1973 | Yada et al. | 370/44 |
| 3,723,657 | 3/1973 | Muller | 370/44 |
| 3,761,621 | 9/1973 | Vollmeyer et al. | 370/44 |
| 4,119,795 | 10/1978 | Höelzl et al. | 370/44 |

Primary Examiner—Douglas W. Olms
Attorney, Agent, or Firm—Holman & Stern

[57] ABSTRACT

A process for the compression of signalling data or the like transmitted in a stream of digital PCM information organized in multiplexing frames, the signalling data being inserted in a specific time slot of the PCM frames, the signalling binary digits transmitted in the same PCM frame belonging to independent signalling channels a, b, ... of rate $H_1$, comprising the steps of extracting the signalling data from the digital stream and effecting in parallel, for each signalling channel, a processing comprising the steps of coding the transitions by a group of binary digits of which the first indicates the polarity of the transition and the following indicates or indicate in which nth fraction of a clock period corresponding to a rate $H_1/n$ the transition is located, and transmitting unchanged at least one of the bits which follow the transition, the signals $L_a$, $L_b$ ... thus obtained containing the same quantity of information as the signalling channels, but having a rate divided by n.

3 Claims, 8 Drawing Figures

PROCESS FOR THE COMPRESSION OF SIGNALLING DATA OR THE LIKE TRANSMITTED IN A TRAIN OF MULTIPLEXED PCM INFORMATION

The present invention relates to a process for the processing of signalling data or the like transmitted in a stream of multiplexed PCM digital information, intended for reducing the digit rate of signalling data without loss of information.

According to present standards, a pulse stream of PCM coded information transmitted at a rate of 2048 kbits/s is composed of multiplexing frames of 32 channel time slots IT, among which 30 are alloted to the transmission of information signals such as speech samples. According to Notice G 732 of the CCITT (International Telephone and Telegraph Consultative Committee), one of the two time slots available, called IT 16, is allocated to the signalling data. The channel time slots IT 16 of 16 consecutive frames constitute a multiframe comprising 16 octets. The channel time slots IT 16 are divided into two parts of 4 bits. The time slot IT 16 of the first frame TrO contains a multiframe alignment word (or multiframe sync) 0000 and a sequence of complementary information. Each half of the time slots IT 16 of the other frames Tr1 to Tr15 contains the signalling data relative to each of the 30 information channels, the corresponding four bits a,b, c,d belonging to independent signalling channels.

The digit rate of each signalling channel is therefore 500 bits/s. This rate is still very rapid having regard to the information to be transmitted, and the signalling data is largely redundant.

Numerous processes for reducing the digit rate are already known. The article by Manfred Dietrich at the Zürich Seminary of 1974 describes a process for reducing by half the digit rate for the speech information transmitted on telephone channels, but does not provide processing for the complementary information such as the signalling data.

If two input pulse streams are subjected to a processing for compression of the speech signals without also compressing the signalling data, and if the two input streams are joined to form a single stream with the same digit rate, the number of channels available for conveying information will be reduced. It is therefore desirable also to subject the signalling data to a compression processing.

To this end, it could be envisaged to transmit only one bit out of two in each signalling channel. Such a solution would have the drawback of doubling the distortion due to the sampling on the signalling data. In the case of a digit rate of 500 bits/s, the distortion would be increased from 2 to 4 ms.

It is therefore an object of the invention to effect a compression of the signalling data without increasing the distortion.

In the process according to the invention for compressing the signalling data, the signalling data is extracted from the pulse stream and, for each signalling channel, a processing is effected in parallel which consists in coding the transitions by a group of bits of which the first indicates the polarity of the transition and the following indicates or indicate in which nth fraction of a clock period corresponding to a rate $H_1/n$ the transition is located, and in transmitting, unchanged, at least one of the bits which follow the transition, the signals $L_a, L_b \ldots$ thus obtained containing the same quantity of information as the signalling channels, but having a rate divided by n.

In the case of it being desired to reduce the rate by half (n=2), one out of two of the bits which follow a transition are preferably transmitted unchanged.

The signals $L_a, L_b \ldots$ representing the signalling channels of an input digital stream may be multiplexed with the signals $L'_a, L'_b, \ldots$ issuing from a second digital stream to form a single signal with the same digit rate as the input signals, but conveying a double amount of information.

The invention will be more readily understood on reading the following description with reference to the accompanying drawings, in which.

The following specification will be limited to describing the reduction of two input digital streams, or interfaces, into a single interface. However, three or four input interfaces may be processed according to a process of the same type, and they may be transmitted on the same output interface.

Figure 1:
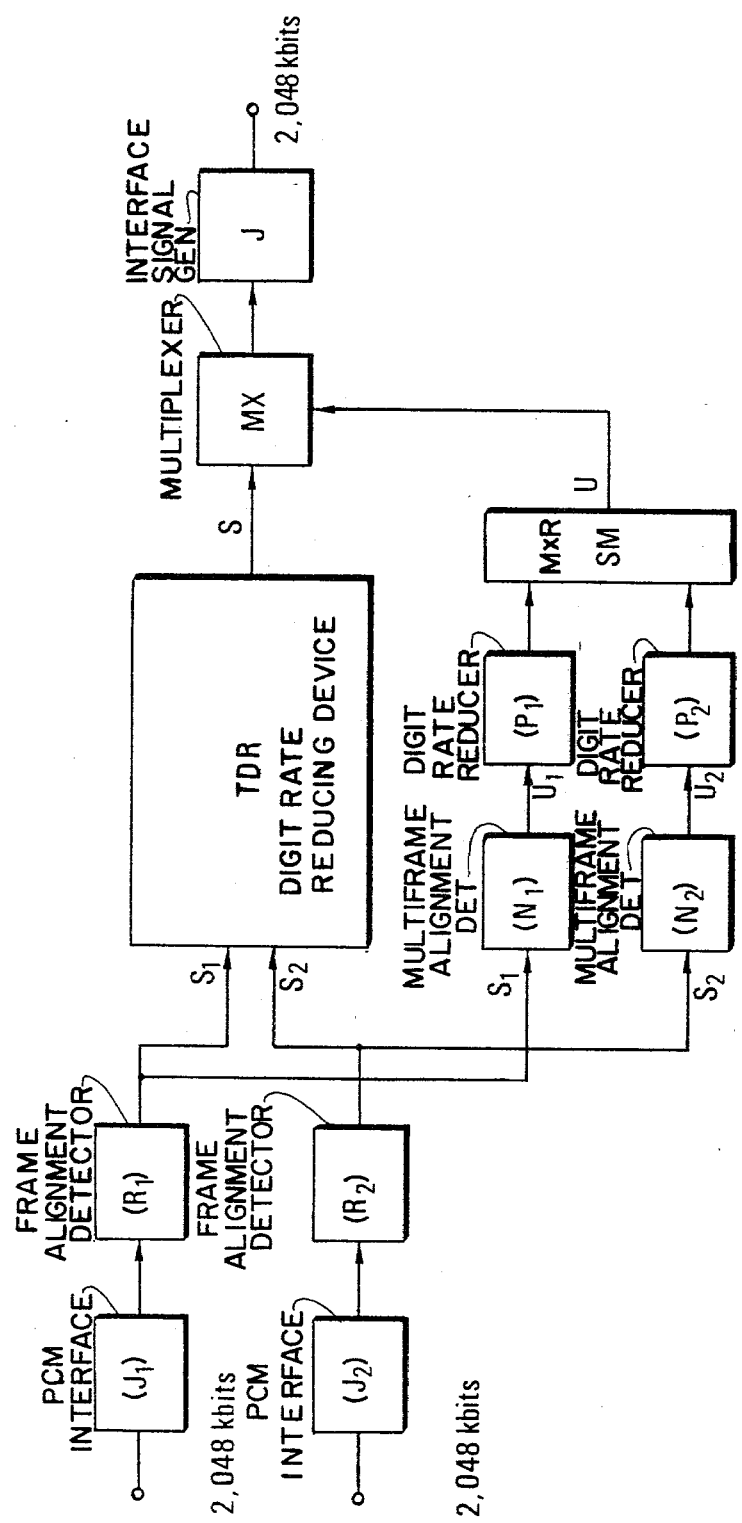
FIG. 1 is an overall view of a device for reducing two streams of multiplexed PCM information into a single stream with the same digit rate.

With reference to FIG. 1, two PCM interfaces $J_1$ and $J_2$, of the $HDB_3$ type, for example, are received by means of respective frame alignment detection devices $R_1$ and $R_2$. The device $R_1$ (or $R_2$) receives at its input the coded signal $J_1$ (or $J_2$) including the signalling data which is inserted in the multiplexing frame in a specific channel time slot called IT 16. This device $R_1$ recognizes the frame alignment word contained in the signal $J_1$ and furnishes a signal $S_1$ in which the coded data signal is separated from the information contained in the IT 16. A TDR device, such as for example the one disclosed in the above-mentioned article by Mr. Dietrich, makes it possible to compress the two digital data streams into a single output train S at 2,048 kbits/s by a reduction of the digit rates for the coded speech samples or other data. The signals $S_1$ and $S_2$ containing the data as well as their IT 16, which are furnished by the frame alignment detection devices $R_1$ and $R_2$, are applied respectively to the input of two multiframe alignment detection devices $N_1$ and $N_2$. The devices $N_1$ and $N_2$ furnish signals $U_1$ and $U_2$ which are transcoded by means of two digit rate reducing devices $P_1$ and $P_2$. A device SM receives the signals from the devices $P_1$ and $P_2$ and multiplexes the same in order to deliver, at the output, a single signal U, which is then multiplexed by means of the device MX with the likewise compressed data signal S.

An interface signal J presenting a rate reduced by half is obtained at the output of the device MX. The useful digit rate reducing device TDR has been described in numerous articles and does not form the subject matter of the present invention. The description will be limited to the processing of the two streams of IT 16 of the input interfaces in order to reduce them to one resultant stream of IT 16, without introducing supplementary distortions and with the same digit rate.

Notice G 732 of the CCITT provides that each interface of rate 2,048 kbits/s is organized as a multiframe formed by 16 consecutive frames numbered from 0 to 15. The multiframe alignment signal is 0000 and occupies the bit time slots numbered from 1 to 4 of the channel time slot numbered 16, called IT 16, in the frame O. The second part of the time slot IT 16 of this frame O, also formed by 4 bits, is alloted to the transmission of complementary information. The time slots IT 16 of all the input frames generally receive eight bits.

The time slot IT 16 of the frame 1 is formed by a first part composed of bits a, b, c, d belonging to four independent signalling channels relative to channel 1, and by a second part composed of signalling bits a,b,c,d for channel 16. The same applies to the signalling of channels 2 to 30 as summarised in the following table.

| IT 16 Tr 0 | IT 16 Tr 1 | IT 16 Tr 2 | | IT 16 Tr 15 | |
|---|---|---|---|---|---|
| abcd | abcd | abcd | abcd | abcd | abcd |
| xyxx | | | | | |
| channel 1 | channel 16 | channel 2 | channel 17 | channel 15 | channel 30 |

It is also recommended not to use the combination 0000 for the signalling bits of channels 1 to 15.

Figure 2:
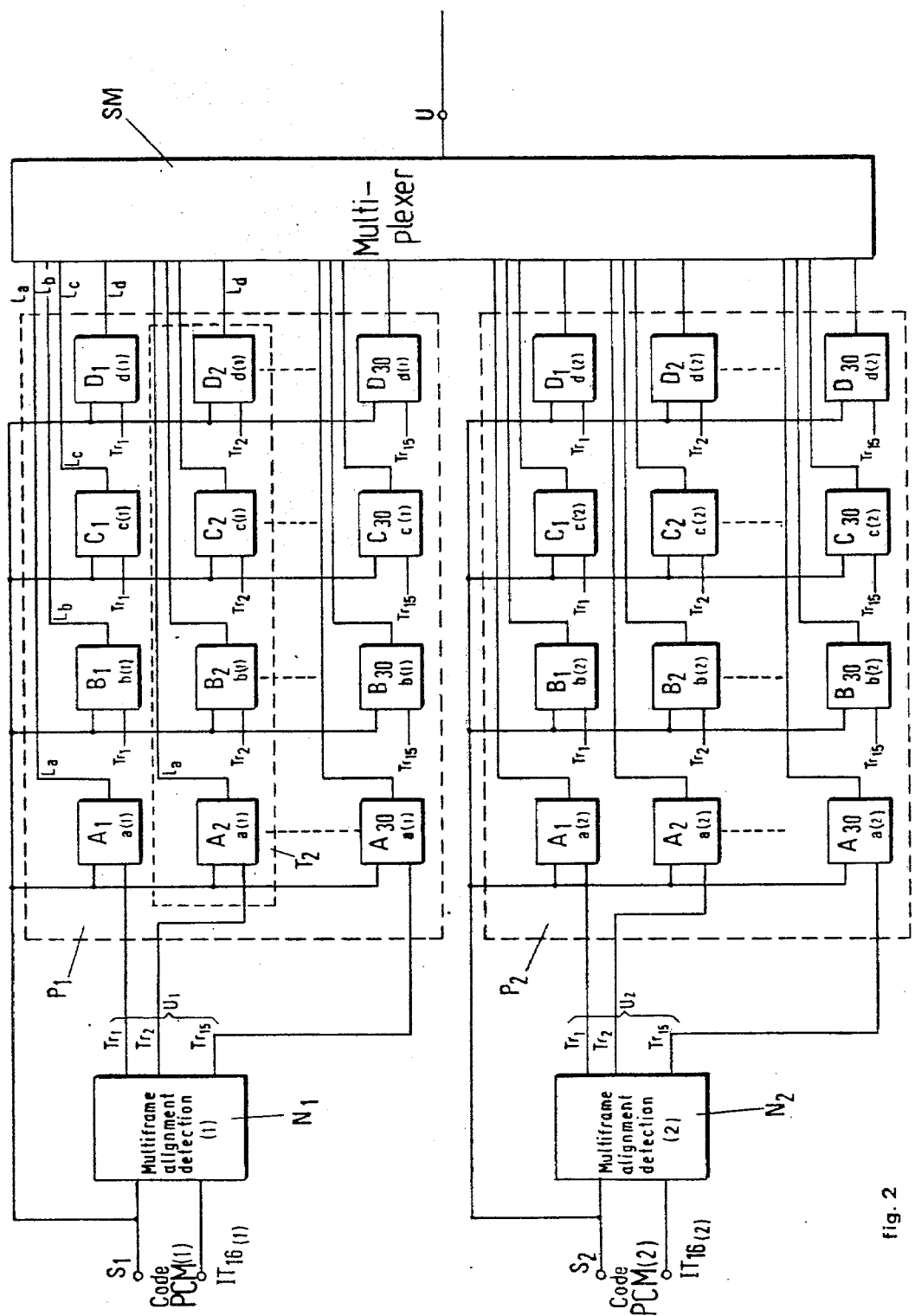
FIG. 2 is an overall view of the device for processing the signalling data in the form of multiframes.

According to FIG. 2, the multiframe alignment detection devices $N_1$ and $N_2$ may thus recognize the multiframe alignment signal of the interfaces $J_1$ and $J_2$ and furnish at the output the 15 time slots IT 16, in parallel, each corresponding to the frames Tr1 ... Tr15. These bits are therefore supplied for the interface $J_1$ (or $J_2$) at the input of a transcoding device $P_1$ (or $P_2$) making it possible, according to the invention, to reduce the amount of signalling data transmitted. The device $P_1$ is composed of thirty devices $T_i$ ($A_i$, $B_i$, $C_i$, $D_i$) with $1 \leq i \leq 30$, placed in parallel and processing in parallel the time slots IT 16 of each interface. Each device $T_i$ is itself composed of four elementary transcoders $A_i$, $B_i$, $C_i$, $D_i$, for converting the four signalling bits of frequency 500 Hz of each frame $Tr_i$ into four bits of frequency 250 Hz.

The first fifteen devices $T_i$ ($1 \leq i \leq 15$) process the first part of the input IT 16, the fifteen devices $T_i$ ($16 \leq i \leq 30$) process the second part of the IT 16.

The device $A_1$ processes the bit a of IT 16 of the frame Tr1, $B_1$ processes the bit b of IT 16 of the frame Tr1, $C_1$ processes the bit c, $D_1$ processes the bit b, where a, b, c, d are the four independent signalling channels, of rate 500 bits/s, relative to a telephone channel, said bits a, b, c, d occupying half the channel time slot IT 16 allocated to this channel.

The device $A_1$ codes the transitions of the digital signal corresponding to the signalling channel a. According to the invention, the input bit is compared with the corresponding bit of the preceding multiframe; 1 is coded if the transition is from 0 to 1, and 0 if the transition is from 1 to 0. Moreover, the following binary digit indicates whether the transition takes place during the first or the second half of the clock period corresponding to the rate of 250 bits/s. This second binary digit is 1 for a transition occurring in the first half of the clock period and 0 for a transition occurring in the second half.

One out of two of the bits following these two bits, belonging to the following multiframes and preceding the following transition, are transmitted, unchanged.

The following table summarises the coding of the transitions effected according to the invention.

| Transition | | Transition | | |
|---|---|---|---|---|
| 1 1st bit | 0 2nd bit | 0 1st bit | 1 2nd bit | Position of the transition |
| 0 | 1 | 1 | 1 | 1st half |
| 0 | 0 | 1 | 0 | 2nd half |

Figure 3:
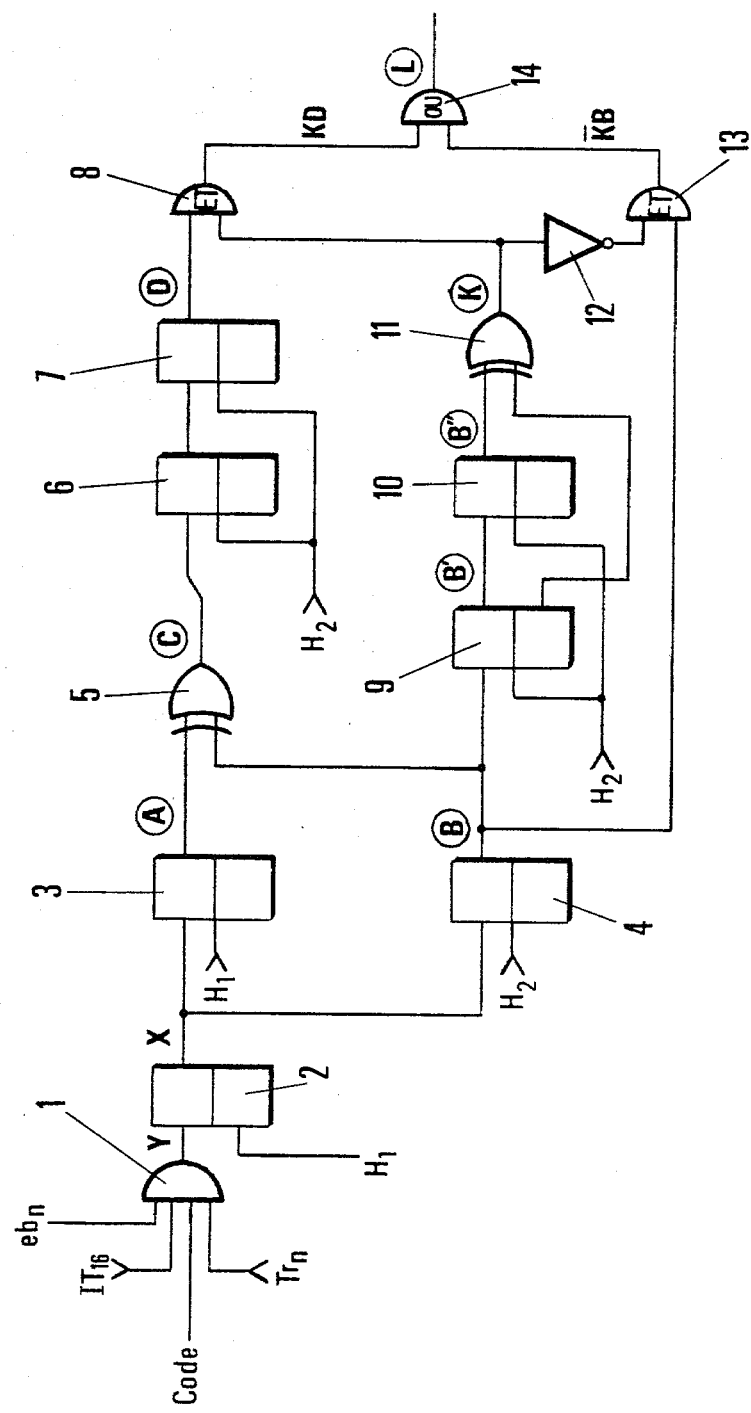
FIG. 3 shows in TTL logic a circuit according to the invention for transcoding a signalling channel.
Figure 4:
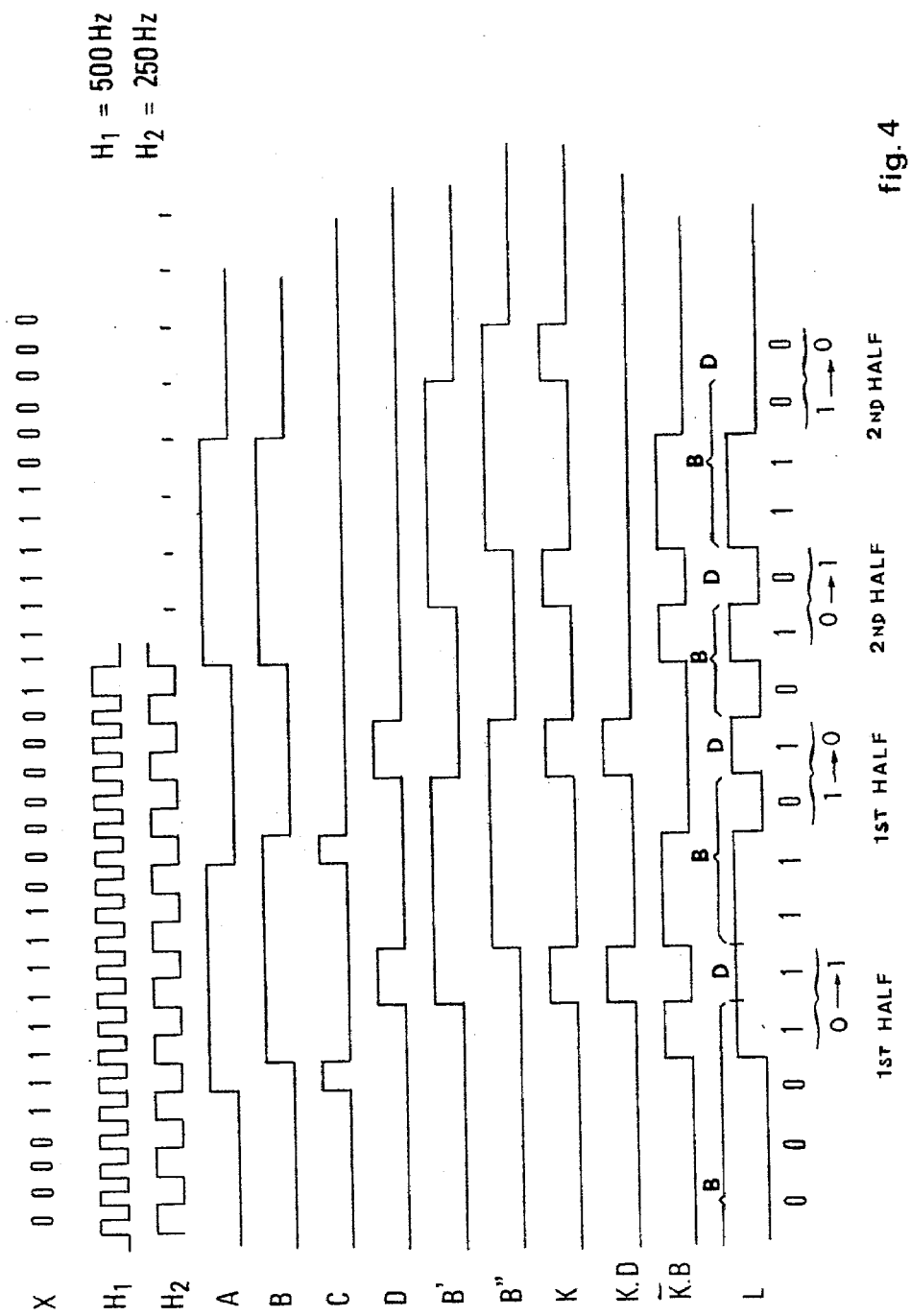
FIG. 4 is a timing chart illustrating the operation of the circuit of FIG. 3.

One embodiment of the transcoding of a signalling channel, for example channel a of a frame, e.g. frame 1 Tr1, is shown in FIG. 3. This device $A_1$ receives at its input a signal $eb_n$ serving to select the bit a in the IT 16, an IT 16 selecting signal, the coding signal at 2,048 kbits/s as well as a signal for selecting the frames Tr1. These four signals are fed to an AND gate/[1] which furnishes at its output a signal Y. This signal Y is applied to the input of a D-type flip-flop 2 receiving on its clock input the clock signal $H_1$ of frequency 500 Hz. The signal X at the output Q of the flip-flop 2 is applied, on the one hand, to the input of a D-type flip-flop 3, on the other hand, to the input of another D-type flip-flop 4. The various signals are shown in FIG. 4. The first flip-flop 3 receives on its clock input the signal $H_1$ at 500 Hz, whilst the second flip-flop 4 receives on its clock input the clock signal $H_2$ of half frequency, viz. 250 Hz. The signals A and B, respectively obtained at the output Q of the flip-flops 3 and 4, are fed at the input of an EXCLUSIVE OR gate 5 which furnishes at its output a signal C which is applied to the input of a D-type flip-flop 6 receiving the signal $H_2$ on its clock input. The output signal Q of the flip-flop 6 is applied to the input of a second D-type flip-flop 7 which receives at its clock input the clock signal $H_2$. The signal D obtained at the output Q of the flip-flop 7 is applied to the input of an AND gate 8.

The signal B furnished by the flip-flop 4 is also applied to the input of a D-type flip-flop 9 receiving on its clock input the signal $H_2$. At the output Q of the flip-flop 9 is obtained a signal B' which is applied to the input of another D-type flip-flop 10 which receives the signal $H_2$ at its clock input. The signal B" is obtained at the output Q of the flip-flop 10 and is applied to the input of an EXCLUSIVE OR gate 11 which also receives the signal furnished at the output $\overline{Q}$ of the flip-flop 9. The signal K indicating the position of the 2nd transition coding bit is obtained at the output of the gate 11. The signal K is applied, on the one hand, to the input of the AND gate 8 with the signal D and, on the other hand, after inversion by means of an inverter 12, to the input of an AND gate 13. The gate 13 also receives the signal B and furnishes at its output a signal $\overline{KB}$. The signal KD obtained at the output of the AND gate 8 is applied with $\overline{KB}$ to the input of an OR gate 14 which furnishes a signal L at its output. The signal L contains the same quantity of information as the input signal and in particular the coded information resulting from the comparison of the input bit a with the corresponding bit a" of the preceding multiframe. The signal L further presents a rate which is half that of the input signal X.

This signal will be called $L_a$ for bit a, $L_b$ for bit b, $L_c$ for bit c, $L_d$ for bit d.

Referring again to FIG. 2, the device $A_1$ furnishes a transcoded signalling signal $L_a$ of frame 1. The devices $B_1$, $C_1$, $D_1$ transcode in the same way the channels (b), (c), (d) for the frame 1 and deliver to the device SM four signalling signals $L_a$, $L_b$, $L_c$, $L_d$ corresponding to the IT 16 (channel 1) of the frame Tr1 containing the information of its multiframe and that of the preceding multiframe. The same applies to the IT 16 of the other fourteen frames of the same interface $J_1$. The second parts of IT 16 of the frames Tr1 to Tr15 are processed in the same manner by the transcoder devices $T_i(A_i, B_i, C_i, D_i)$ with $15 \leq i \leq 30$.

The fifteen transcoded signals IT 16 of the interface $J_1$ are received in parallel at the input of a multiplexer SM which also receives the fifteen IT 16 of the interface $J_2$ in parallel. The multiplexer SM is known per se. The device SM groups the IT 16 of each frame and of each interface, not in a multiframe of 16 frames, but in a superframe U of 32 frames, said superframe being formed by a transcoded multiframe of the interface $J_1$ and a transcoded multiframe of the interface $J_2$.

Figure 5:
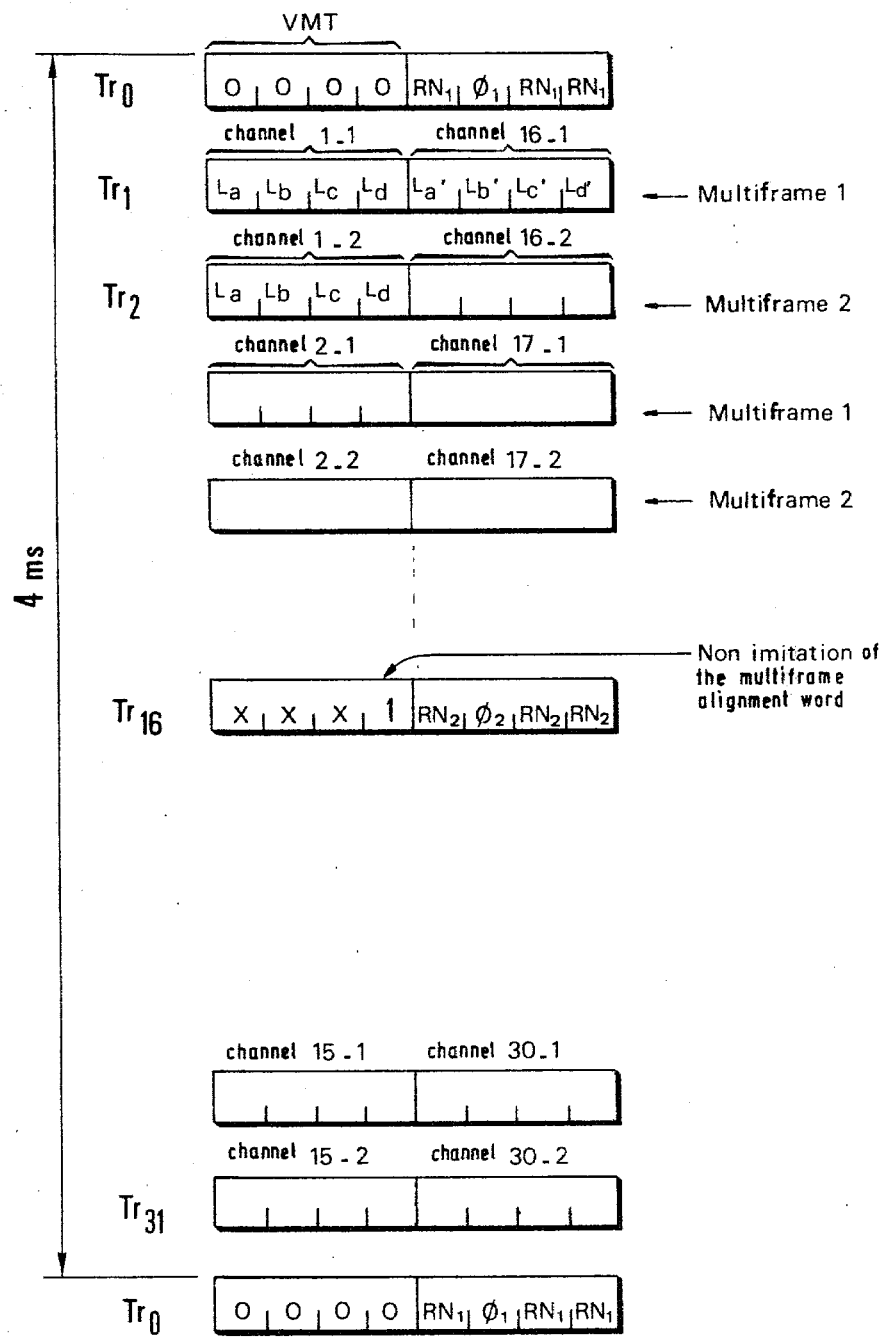
FIG. 5 shows the structure of a superframe grouping the signalling channels of two input streams.

FIG. 5 shows a superframe. The superframe alignment signal is identical to the multiframe alignment signal and is equal to 0000: it occupies the bit time slots numbered 1 to 4 of the channel time slot IT 16 in the frame O. The other four bits of the time slot IT 16 in the frame O convey the complementary information noted $RN_1$, $\phi_1$, $RN_1$, $RN_1$.

The time slot IT 16 of the frame 1 contains in its first half (bits $L_a$, $L_b$, $L_c$, $L_d$) the signalling of the channel 1 of the first multiframe (channel 1-1) and in its second half the signalling (bits $L_a$, $L_b$, $L_c$, $L_d$) of the channel 16 of the first multiframe. The IT 16 of the frame 2 contains in its first part the signalling (bits $L_a$, $L_b$, $L_c$, $L_d$) of the channel 1 of the second multiframe and in its second part the signalling of the channel 16 of the second multiframe. Thus, the IT 16 of the superframe according to the invention are alternately the transcoded IT 16 of the interface 1 then of the interface 2 according to whether one passes from frame 1 to frame 2. The IT 16 of even frames in the superframe are generally those of the interface 2 and those of odd frames are those of interface 1. And so on, the IT 16 of the frame 16 contains in its first part bits not imitating a multiframe alignment word and in its second part complementary information of the second multiframe. The IT 16 of the frame 30 contains in its first part the transcoded signalling of the channel 15 of the first multiframe and in its second part the signalling of the channel 30 of the first multiframe (it is still the transcoded IT 16 of the frame 15 in the first multiframe). Finally, the IT 16 of the frame 31 is the transcoded IT 16 of the frame 15 in the second multiframe. The second superframe presenting the same organisation is then transmitted.

It will be noted that a superframe alignment word is sufficient every 32th frame and not every 16th frame, or every 4 ms. Such an arrangement allows a saving to be made in digit rate.

A superframe signal U is then multiplexed, with the useful signal S of half digit rate, by means of the multiplexer MX which furnishes an interface signal of rate 2,048 Kbits/s equal to that of the input interfaces $J_1$ and $J_2$.

Figure 6:
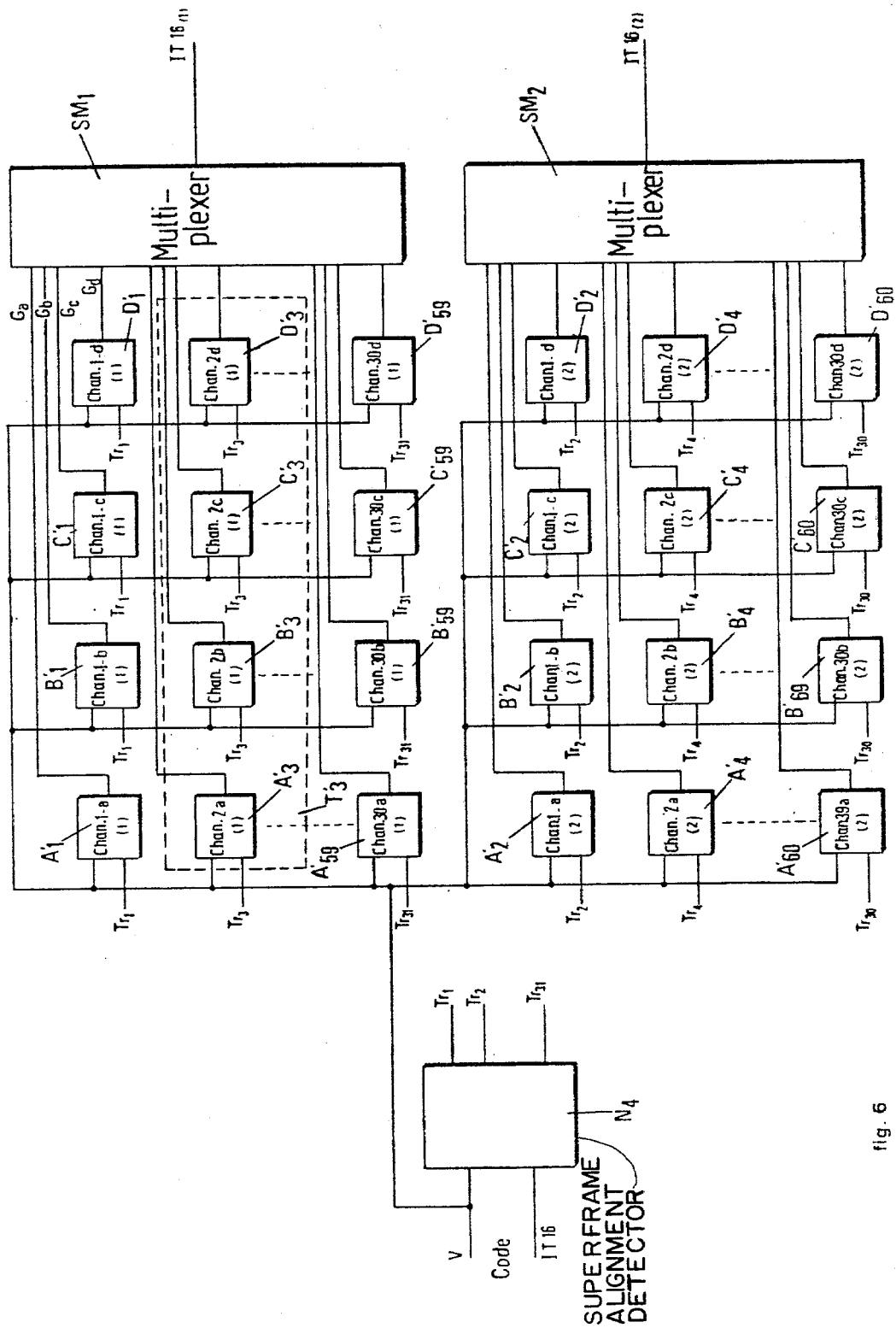
FIG. 6 shows the receiving device for recovering the input multiframes from a superframe.

FIG. 6 shows the device receiving the superframe formed by the IT 16. A frame alignment device (not shown) furnishes the IT 16 signal at the input of a superframe alignment detection device N4. This device N4 also receives the code signal V and furnishes at its output the 31 IT 16 of the 32 frames, forming the superframe, in parallel. The IT 16 of the 31 frames Tr1, Tr2 ... Tr'31 are applied to the input of 60 decoding devices $T'_i$ $1 \leq i \leq 60$ according to the invention, each $T'_i$ being formed by four devices $A'_i$, $B'_i$, $C'_i$, $D'_i$. The device $A'_i$ processes the bit $L_a$ of channel 1 of the fist multiframe. Device $A'_2$ processes the bit $L_a$ of channel 1 of the second multiframe. Device $A'_3$ processes the bit $L_a$ of channel 2 of the first multiframe, etc. The device $A'_{59}$ processes the bit $L_a$ of the channel 30 of the first multiframe. The device $A'_{60}$ processes the bit $L_a$ of the channel 30 of the second multiframe. The same applies to bits $L_b$, $L_c$, $L_d$.

Figure 7:
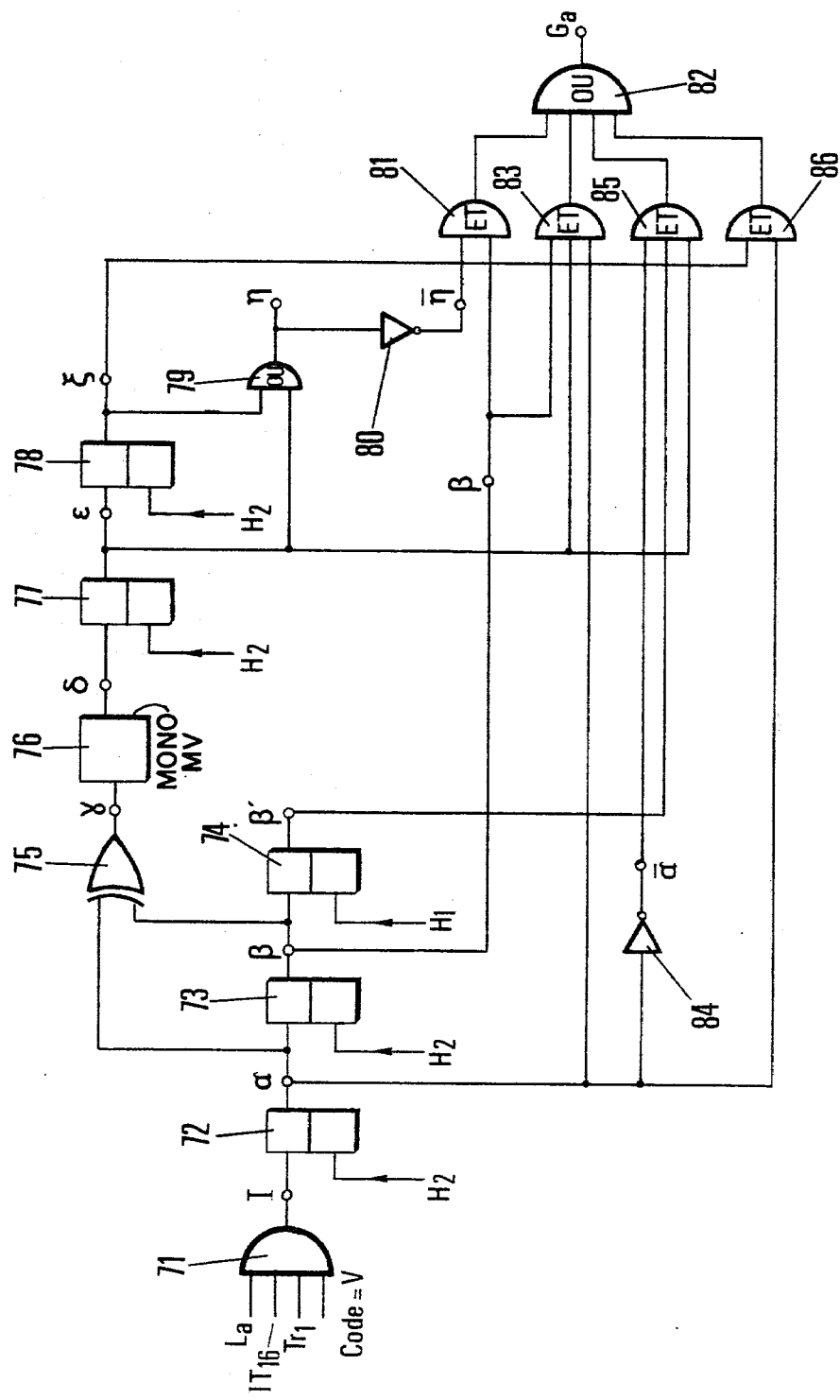
FIG. 7 illustrates an embodiment of one of the circuits A' constituting the receiving device.

FIG. 7 gives an embodiment of a device $A'_i$ of FIG. 6. The device $A'_1$ is composed of an AND gate 71 receiving a signal $eb_n$ selecting the bit $L_a$, a signal selecting the IT 16, a signal selecting the frames Tr1 and the code signal V. The gate 71 furnishes at its output a signal I which is applied to the input of a D-type flip-flop 72 whose clock input receives the clock signal $H_2$ at 250 Hz. At the output Q of the flip-flop 72 a signal $\alpha$ is obtained which is applied to the input of another D-type flip-flop 73 as well as to the input of an EXCLUSIVE OR gate 75, the signal $H_2$ is also applied to the clock input of the flip-flop 73 and at its output Q a signal $\beta$ is obtained which is, on the one hand, applied to the input of the gate 75 and, on the other hand, to the input of another D-type flip-flop 74. This flip-flop 74 receives on its clock input the clock signal $H_1$ of period 500 Hz and furnishes a signal $\beta'$ at its output Q.

Figure 8:
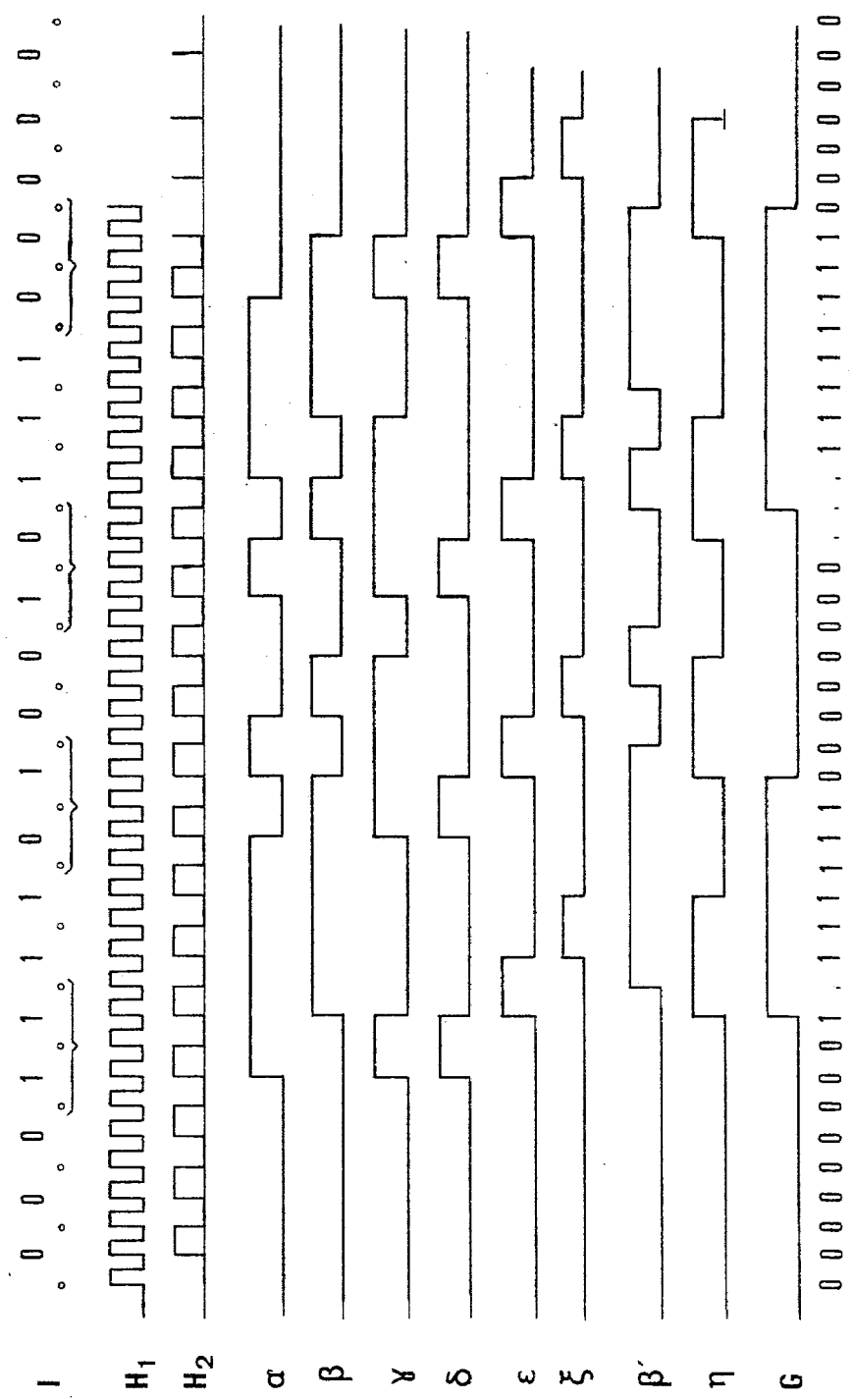
FIG. 8 is a timing chart illustrating the functioning of the circuit of FIG. 7.

A timing chart shown in FIG. 8 specifies the successive processing of the signals I, $\alpha$, $\beta$, $\beta'$ by means of the different devices of FIG. 7.

The EXCLUSIVE OR gate 75 derives from the signals $\alpha$ and $\beta$ a signal $\gamma$ which recognizes the transitions. This signal $\gamma$ is applied to the input of a monostable multivibrator 76 which furnishes at its output a signal $\delta$ indicating the position of the first transcoded bit. The signal $\delta$ is applied to the input of a D-type flip-flop 77 which receives, at its clock input, the signal $H_2$. The flip-flop 77 furnishes at its output Q a signal $\epsilon$ representing the position of the second transcoded bit. This signal $\epsilon$ is applied to the input of another D-type flip-flop 78, which receives on its clock input the clock signal $H_2$. The flip-flop 78 furnishes at its output Q a signal $\xi$ which is applied to the input of the OR gate 79 in the same way as the signal $\epsilon$ issuing from the flip-flop 77. A signal $\eta$ is obtained at the output of the gate 79, which, after inversion by means of an inverter 80, is applied to the input of an AND gate 81. The AND gate 81 also receives the signal $\beta$ from the flip-flop 73 and furnishes at its output a signal which is applied to one of the four inputs of an OR gate 82. The second input of the OR gate 82 receives the signal furnished by a second AND gate 83 which receives on the one hand the signal $\beta$, on the other hand the signal $\epsilon$ and signal $\alpha$.

The third input of the OR gate 82 receives the signal furnished by a third AND gate 85 which receives the signal $\bar{\alpha}$ obtained by inversion of the signal $\alpha$ by means of an inverter 84, on the other hand the signal $\epsilon$ and finally the signal $\beta'$ from the flip-flop 74.

The fourth input of the OR gate 82 receives the signal from a fourth AND gate 86 which receives at its input the signal $\epsilon$ as well as signal $\alpha$.

The OR gate 82 furnishes at its output the signal $G_a$ constituting an interface signalling channel. In the same way, the devices B′₁, C′₁, D′₁ furnish signals $G_b$, $G_c$, $G_d$. The four signals $G_a$, $G_b$, $G_c$, $G_d$ are then multiplexed by means of the multiplexer SM1 which is of the type known per se. An IT 16 signal of multiframe 1 is reshaped at the output of the multiplexer SM1. It is easy to remultiplex said IT 16 signal in well known manner with the multiframe signal of the interface J₁. In the same way, four signalling signals $G_a$, $G_b$, $G_c$, $G_d$ are also obtained for the second multiframe which the multiplexer SM2 recombines to recover the IT 16 of multiframe 2.

Such embodiments, both at transmission and reception, are not limitative. They consist in a grouping of the IT 16 of at least two input interfaces on the same output interface, this grouping being effected by a processing in parallel, channel by channel, each IT 16 comprising four individual time multiplexed channels.

As has been stated hereinabove, the invention is not limited to the compression of two input signals into a single signal of the same rate and, with a process of the same type, it is possible to process, for example, four input signals to form them into a single signal.

In this latter case, a clock $H_2$ of frequency $H_1/4 = 125$ Hz is used. The transitions are coded by a bit indicating the polarity of the transition, and by two bits defining in which quarter of the clock period at 125 Hz the transition is located. One out of three of the bits which follow the transition are then transmitted unchanged.

Concerning the transmission of the bits which follow the transitions, it is not critical in the invention that this transmission be continued throughout the interval between two transitions, but it is important that at least one bit is transmitted unchanged after a transition, so as to confirm the information conveyed when coding the transition.

What is claimed is:

1. A process for the compression of signalling data or the like transmitted in a stream of digital PCM information organized in multiplexing frames, the signalling data being inserted in a specific time slot of the PCM frames, the signalling binary digits transmitted in the same PCM frame belonging to independent singalling channels a, b, . . . of rate $H_1$, comprising the steps of extracting the signalling data from the digital stream and effecting in parallel, for each signalling channel, a processing comprising the steps of coding the transitions by a group of binary digits of which the first indicates the polarity of the transition and the following indicates or indicate in which nth fraction of a clock period corresponding to a rate $H_1/n$ the transition is located, n being an integer having a value in the range from two to five, inclusive, and transmitting unchanged at least one of the bits which follow the transition, the signals $L_a$, $L_b$ . . . thus obtained containing the same quantity of information as the signalling channels, but having a rate divided by n.

2. A process as claimed in claim 1, wherein, in the case of n being equal to 2, one out of two of the bits which follow a transition are transmitted, unchanged.

3. A device for the compression of signalling data or the like transmitted in a stream of digital PCM information organized in multiplexing frames, the signalling data being inserted in a specific time slot of the PCM frames, the signalling binary digits transmitted in the same PCM frame belonging to independent signalling channels a, b, . . . of rate $H_1$, comprising the steps of extracting the signalling data from the digital stream and effecting in parallel, for each signalling channel, a processing comprising the steps of coding the transitions by a group of binary digits of which the first indicates the polarity of the transition and the following indicates or indicate in which nth fraction of a clock period corresponding to a rate $H_1/n$ the transition is located, n being an integer in the range from two to five, inclusive, and transmitting unchanged at least one of the bits which follow the transition, the signals $L_a$, $L_b$ . . . thus obtained containing the same quantity of information as the signalling channels, by having a rate divided by n, whereby the transitions are coded in a device comprising, for each signalling channel, a first AND gate, and first flip-flop connected to the output of said first AND gate and receiving a $H_1$ clock signal, a second flip-flop connected to the output of said first flip-flop and receiving the $H_1$ clock signal, a third flip-flop connected to the output of said first flip-flop and receiving a $H_1/n$ clock signal, a first EXCLUSIVE OR gate connected to the outputs of said second and third flip-flops, a fourth flip-flop connected to the output of the EXCLUSIVE OR gate and receiving the $H_1/n$ clock signal, a fifth flip-flop connected to the output of said fourth flip-flop and receiving the $H_1/n$ clock signal, a sixth flip-flop connected to the output of said third flip-flop and receiving the $H_1/n$ clock signal, a seventh flip-flop connected to the sixth flip-flop and receiving the $H_1/n$ clock signal, a second EXCLUSIVE OR gate connected to the outputs of said sixth and seventh flip-flops, a second AND gate connected to said fifth flip-flop and to said second EXCLUSIVE OR gate, an inverter connected to said second EXCLUSIVE OR gate, a third AND gate connected to said inverter and to said third flip-flop, and an OR gate connected to said second and third AND gates.

* * * * *